(12) United States Patent
Nishibata et al.

(10) Patent No.: US 9,413,278 B2
(45) Date of Patent: Aug. 9, 2016

(54) CONTROL DEVICE FOR ROTATING ELECTRICAL MACHINE

(71) Applicant: DENSO CORPORATION, Kariya, Aichi-pref. (JP)

(72) Inventors: Koichi Nishibata, Kariya (JP); Hiroya Tsuji, Yokkaichi (JP); Hajime Uematsu, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 13/932,373

(22) Filed: Jul. 1, 2013

(65) Prior Publication Data

US 2014/0001991 A1 Jan. 2, 2014

(30) Foreign Application Priority Data

Jun. 29, 2012 (JP) ................. 2012-146372

(51) Int. Cl.
*H02P 6/10* (2006.01)
*H02P 21/05* (2006.01)
*B60L 11/14* (2006.01)
(Continued)

(52) U.S. Cl.
CPC . *H02P 6/10* (2013.01); *B60L 11/14* (2013.01); *B60L 15/007* (2013.01); *B60L 15/025* (2013.01); *B60L 15/2054* (2013.01); *H02P 21/05* (2013.01); *B60L 2210/40* (2013.01); *B60L 2220/14* (2013.01); *B60L 2240/421* (2013.01); *B60L 2240/423* (2013.01); *B60L 2240/443* (2013.01); *B60L 2240/486* (2013.01); *B60L 2240/507* (2013.01); *H02P 2205/05* (2013.01); *Y02T 10/643* (2013.01); *Y02T 10/70* (2013.01);

(Continued)

(58) Field of Classification Search
USPC .................. 318/230, 432, 503, 717, 798
See application file for complete search history.

(56) References Cited

U.S. PATENT DOCUMENTS 4,137,489 A * 1/1979 Lipo ........................ 318/798
7,982,326 B2 * 7/2011 Tan et al. ................... 290/44
(Continued)

FOREIGN PATENT DOCUMENTS

JP 09-215398 8/1997
JP 10-023609 1/1998
(Continued)

OTHER PUBLICATIONS

Office Action (3 pages) dated Apr. 15, 2014, issued in corresponding Japanese Application No. 2012-146372 and English translation (3 pages).

*Primary Examiner* — Eduardo Colon Santana
*Assistant Examiner* — Cortez Cook
(74) *Attorney, Agent, or Firm* — Nixon & Vanderhye P.C.

(57) ABSTRACT

A control device for a rotating electrical machine is provided that is capable of suppressing reduction in controllability of torque attributed to harmonic currents. According to the exemplary embodiment of the present invention, a designated torque value Trq* designated by a hybrid vehicle electronic control unit (HVECU) is corrected by a compensation amount ΔTrq calculated using a harmonic voltage Vh, the designated torque value Trq*, and an electric angular velocity ω as inputs. An operating signal generating section generates an operating signal g¥# using a designated norm value Vn set based on the corrected torque designated value Trq* and a phase δ serving as a manipulated variable for performing feedback control of an estimated torque to the designated torque value Trq*, and outputs the generated operating signal g¥# to a power supply circuit of a motor generator.

18 Claims, 8 Drawing Sheets

(51) Int. Cl.
  *B60L 15/00* (2006.01)
  *B60L 15/02* (2006.01)
  *B60L 15/20* (2006.01)
(52) U.S. Cl.
  CPC .......... *Y02T 10/7077* (2013.01); *Y02T 10/7241* (2013.01); *Y02T 10/7275* (2013.01)

(56) References Cited

U.S. PATENT DOCUMENTS

2002/0107617 A1   8/2002   Tomikawa
2006/0132082 A1 *   6/2006   Ihm ...................... H02P 21/06\
                                                        318/717
2009/0267555 A1 *  10/2009   Schulz et al. ................ 318/432
2011/0193509 A1 *   8/2011   Ooyama et al. ............... 318/503

FOREIGN PATENT DOCUMENTS

| | | |
|---|---|---|
| JP | 2002-233006 | 8/2002 |
| JP | 2008-072832 | 3/2008 |
| JP | 4839119 | 10/2011 |
| WO | WO 2011128695 A2 * | 10/2011 |

* cited by examiner

1

CONTROL DEVICE FOR ROTATING ELECTRICAL MACHINE

CROSS-REFERENCE TO RELATED APPLICATION

This application is based on and claims the benefit of priorities from earlier Japanese Patent Application No. 2012-146372 filed Jun. 29, 2012 the description of which is incorporated herein by reference.

BACKGROUND OF THE INVENTION

1. Field of the Invention

The present invention relates to a control device for a rotating electrical machine that controls the torque of the rotating electrical machine by converting direct-current voltage to alternating-current voltage and applying the alternating-current voltage to the rotating electrical machine.

2. Description of the Related Art

As this type of device, for example, JP-B-4839119 proposes correction of a designated torque value based on an electric angular velocity and the input voltage of an inverter when the output voltage of the inverter is manipulated, to perform feedback control of a current flowing through a motor to a current based on the designated torque value. This technique is proposed in light of the actual torque of the motor not necessarily becoming the designated torque value depending on the feedback control to the current based on the designated torque value.

In the overmodulation range of the rotating electrical machine, the effects of harmonic currents become significant due to increase in harmonic components included in the output voltage of the inverter. The inventors have discovered that, depending on the specification of the motor and the like, reduction in the controllability of torque may become significant due to harmonic currents.

Therefore, a control device for a rotating electrical machine is desired that is capable of suppressing reduction in the controllability of torque due to harmonic currents.

SUMMARY

As an exemplary embodiment, the present application provides a control device of a rotating electrical machine including: a harmonic current information acquiring section that acquires information related to harmonic currents flowing to the rotating electrical machine; a manipulated variable calculating section that uses the acquired information related to harmonic currents as input, and calculates a manipulated variable to control torque serving as a controlled variable of the rotating electrical machine to a designated torque value; and an operating section that operates an alternating-current voltage applying device that applies an alternating-current voltage to the rotating electrical machine, based on the manipulated variable calculated by the manipulated variable calculating section.

According to the configuration, a manipulated variable capable of compensating loss attributed to harmonic currents can be calculated through use of the information related to harmonic currents. Moreover, control accuracy of the designated torque value can be improved.

Expansion of the concept related to the following exemplary embodiments of the present invention is described under "Other Embodiments" following the description of the exemplary embodiments.

DETAILED DESCRIPTION OF THE PREFERRED EMBODIMENTS

First Embodiment

A first embodiment will hereinafter be described with reference to the drawings. According to the first embodiment, an example is given in which the present invention is applied to a control device for a rotating electrical machine (motor generator) serving as a main driving engine mounted in a hybrid car.

Figure 1:
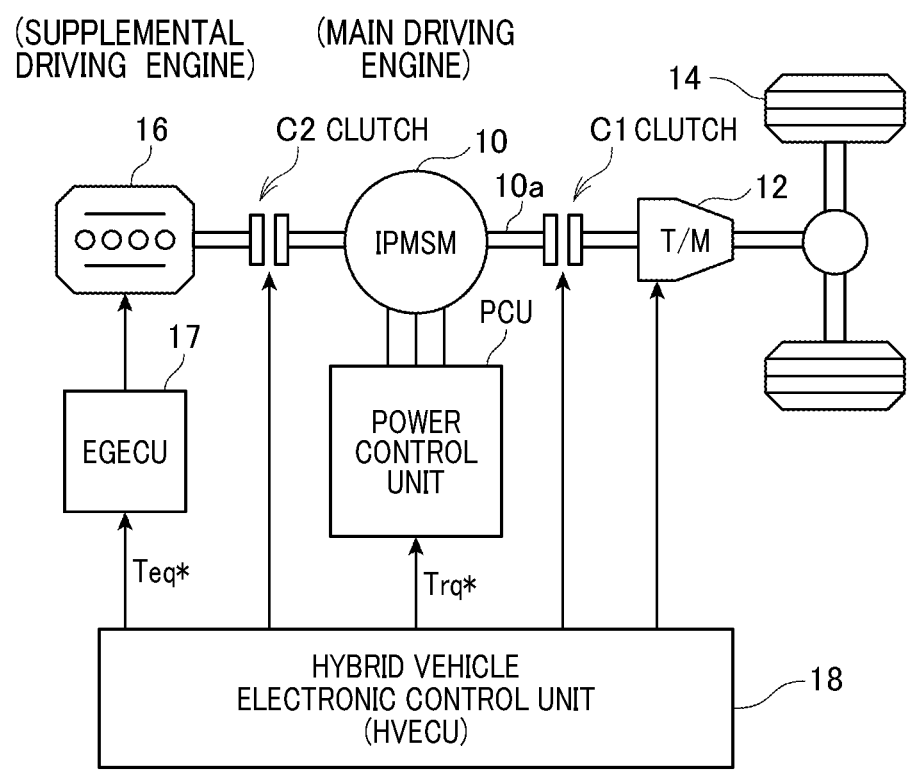
FIG. 1 is a diagram of a system configuration according to a first embodiment.

FIG. 1 is a diagram of a system configuration according to the first embodiment.

As shown in FIG. 1, a motor generator 10 that is a rotating electrical motor is a three-phase electric motor/power generator serving as the main driving engine of a hybrid car. The motor generator 10 is mechanically connected to a driving wheel 14. In other words, a rotating shaft 10a of the motor generator 10 is mechanically connected to the driving wheel 14 with an electronically controlled clutch C1 and a transmission 12 therebetween. According to the first embodiment, the motor generator 10 is assumed to be an interior permanent magnet synchronous motor (IPMSM).

The rotating shaft 10a of the motor generator 10 is further mechanically connected to an internal combustion engine (gasoline engine 16) serving as a supplemental driving engine, with an electronically controlled clutch C2 therebetween A hybrid vehicle electronic control unit (HVECU 18) operates the motor generator 10, the gasoline engine 16, and the transmission 12 such as to control the controlled variables thereof. Specifically, the HVECU 18 divides the requested torque of the driving wheel 14 into a designated torque value Trq* of the motor generator 10 and a designated torque value Teg* of the gasoline engine 16. The HVECU 18 then outputs the designated torque value Trq* to a power control unit PCU and the designated torque value Teg* to a gasoline engine electronic control unit (EGECU 17). As a result, the power control unit PCU controls the torque of the motor generator 10 to the designated torque value Trq*. The EGECU 17 controls the torque of the gasoline engine 16 to the designated torque value Teg*. In addition, the HVECU 18 performs engaging and releasing operations of the clutches C1 and C2.

Figure 2:
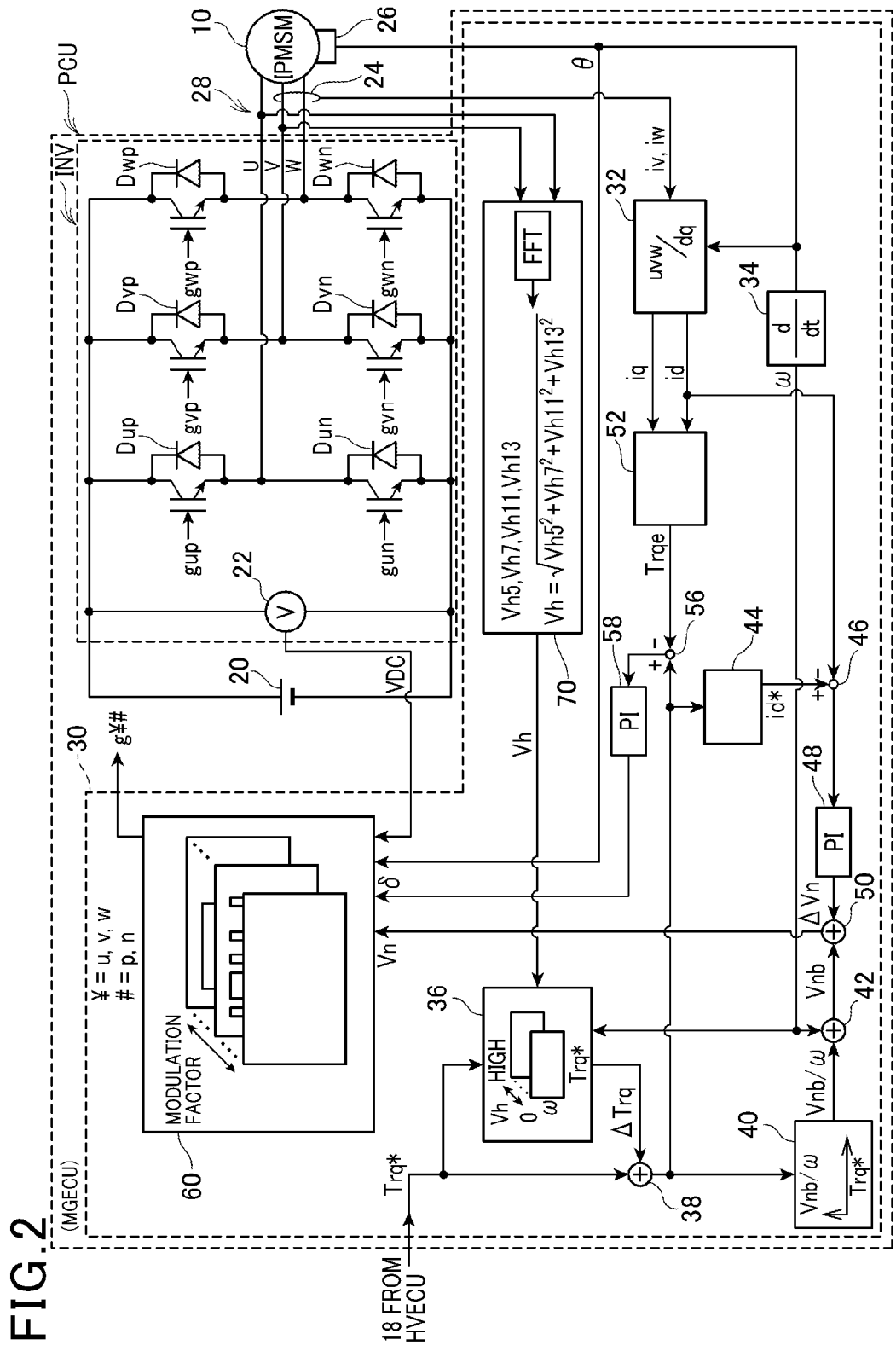
FIG. 2 is a block diagram of processes related to torque control according to the first embodiment.

FIG. 2 is a block diagram of processes related to torque control according to the first embodiment. FIG. 2 shows the motor generator 10 and the power control unit PCU. As shown in FIG. 2, the motor generator 10 is connected to a high voltage battery 20 via an inverter INV within the power control unit PCU. The inverter INV includes three sets of serially connected members composed of switching elements S¥p and S¥n (¥=u, v, w). The respective connection points of the serially connected members are respectively connected to the U-phase, the V-phase, and the W-phase of the motor generator 10. According to the first embodiment, insulated gate bipolar transistors (IGBT) are used as the switching elements S¥# (¥=u, v, w; #=n, p). A diode D¥# is connected in reverse parallel to each switching element ¥#.

According to the first embodiment, the following is included as a detecting means for detecting the state of the motor generator 10 and the inverter INV. First, a voltage sensor 22 that detects the input voltage (power supply voltage VDC) of the inverter INV is included. In addition, a current sensor 24 that detects currents iv and iw that flow through the V-phase and the W-phase of the motor generator 10 is included. Furthermore, a rotation angle sensor 26 that detects the rotation angle (electrical angle θ) of the motor generator 10 is included.

The detection values of the various sensors are loaded into a motor generator electronic control unit (MGECU30) via an interface. The MGECU 30 generates and outputs operating signals for operating the inverter INV based on the detection values of the various sensors. Here, the signals for operating the switching elements S¥# of the inverter INV are operating signals g¥#.

The MGECU 30 operates the inverter INV such as to control the torque of the motor generator 10 to the above-described designated torque value Trq*. Regarding this operation, "Overview of processes related to control of the motor generator 10" will first be described hereafter, followed by a description of "Process for correcting the designated torque value Trq*".

[Overview of Processes Related to Control of the Motor Generator 10]

A two-phase converter 32 converts the currents iv and iw detected by the current sensor 24 to a d-axis actual current id and a q-axis actual current iq that are currents of the rotating frame. On the other hand, a velocity calculating section 34 calculates an electric angular velocity ω based on the electric angle θ detected by the rotation angle sensor 26.

A correcting section 38 within the MGECU 30 corrects the designated torque value Trq* by adding a compensation amount ΔTrq calculated by a compensation amount calculating means (compensation amount calculating section 36) to the designated torque value Trq*. The output of the correcting section 38 becomes the input of a norm setting section 40.

The norm setting section 40 uses the designated torque value Trq* outputted by the correcting section 38 as input, and sets a designated velocity normalizing norm value Vnb/ω that is obtained by a base value Vnb of a norm of an output voltage vector of the inverter INV being divided by the electric angular velocity ω. Here, among the norms capable of generating the designated torque value Trq*, the norm base value Vnb is used to perform minimum-current maximum-torque control. A velocity multiplying section 42 calculates the norm base value Vnb by multiplying the designated velocity normalizing norm value Vnb/ω by the electric angular velocity ω.

On the other hand, a designated current setting section 44 sets a designated value (designated current id*) of the d-axis current for actualizing the designated torque value Trq*. Here, the designated current id* is the current value on the d-axis required when the designated torque value Trq* is actualized by minimum-current maximum-torque control. This is to achieve consistency with the setting made by the norm setting section 40.

A deviation calculating section 46 subtracts the actual current id from the designated current id* and inputs the result into a correction amount calculating section 48. The correction amount calculating section 48 uses the output signal from the deviation calculating section 46 as input, and calculates a correction amount ΔVn of the norm base value Vnb as a manipulated variable for performing feedback control of the actual current id to the designated current id*. The correction amount ΔVn can be calculated as a sum of the respective outputs of a proportional element and an integrated element of which the above-described deviation is the input. The actual current id serving as the input of the deviation calculating section 46 has preferably undergone a low-pass filtering process for removing higher harmonic components.

A correcting section 50 calculates the designated final norm value Vn by adding the correction amount ΔVn to the norm base value Vnb.

On the other hand, a torque estimator 52 uses the actual currents id and iq as inputs, and calculates an estimated torque Trqe of the motor generator 10. The process may be performed by calculation using a map storing the relationship between the actual currents id and iq and torque, or using a model formula. A deviation calculating section 56 subtracts the estimated torque Trqe from the designated torque value Trq* outputted by the correcting section 38 and inputs the result into a phase setting section 58. The phase setting section 58 sets a phase δ as a manipulated variable for performing feedback control of the estimated torque Trqe to the designated torque value Trq*. Specifically, the phase δ is calculated as a sum of the respective outputs of the proportional element and the integrated element of which the output signal of the deviation calculating section 56 is the input.

Then, an operating signal generating section 60 generates and outputs an operating signal g¥# based on the phase δ set by the phase setting section 58, the designated norm value Vn outputted by the correcting section 50, the power supply voltage VDC, and the electric angle θ. Specifically, the operating signal generating section 60 stores an operating signal waveform amounting to a single rotation cycle of the electric angle for each modulation factor as map data. The operating signal generating section 60 calculates the modulation factor based on the power supply voltage VDC and the designated norm value Vn and selects the corresponding operating signal waveform based on the calculated modulation factor. Here, the upper limit of the modulation factor is "1.27" that is the modulation factor during rectangular wave control. Therefore, when the modulation factor is the maximum value "1.27", as the operating signal waveform, a waveform (single pulse waveform) is selected in which a period in which the switching element S¥p on the high potential side is set to ON and a period in which the switching element S¥n on the low potential side is set to ON each occur once during a single rotation cycle of the electric angle. This waveform is the waveform during rectangular wave control.

After selecting the operating signal waveform in this way, the operating signal generating section 60 generates the operating signal by setting the output timing of the waveform based on the phase δ set by the phase setting section 58. When the modulation factor is the maximum value "1.27" and rectangular wave control is performed, field-weakening control is performed by manipulation of the phase δ by the phase setting section 58.

[Process for Correcting the Designated Torque Value Trq*]

As described above, should the pulse pattern of the inverter INV be decided based on the designated norm value Vn and the power supply voltage VDC that are determined based on the designated torque value Trq*, and the phase δ be manipulated by the manipulated variable for performing torque feedback control, the torque of the motor generator 10 can basically be controlled to the designated torque value Trq*. However, when the manipulated variable of the inverter INV is determined based on the designated torque value Trq* inputted into the MGECU 30, the actual torque of the motor generator 10 may be smaller than the designated torque value Trq*. This is because not all current flowing through the motor generator 10 contributes to generation of torque. Therefore, according to the first embodiment, a process is performed to compensate for the amount of loss of the current not contributing to the generation of torque.

Here, factors causing loss include mechanical loss and core loss. Core loss is largely classified into hysteresis loss and eddy current loss. Here, hysteresis loss includes that attributed to harmonic currents, in addition to that attributed to fundamental current. According to the first embodiment, increase in hysteresis loss caused by harmonic currents is a particular concern. Therefore, compensation for only hysteresis loss attributed to the fundamental current is insufficient for the actual amount of loss. Here, according to the first embodiment, hysteresis loss attributed to harmonic currents is also compensated based on information on the harmonic components of the output voltage of the inverter INV.

Specifically, a harmonic voltage calculating section 70 uses a detection value of a line-to-line voltage sensor 28 as input, and calculates a harmonic voltage Vh based on the detection value. The line-to-line voltage sensor 28 detects the voltage (output line-to-line voltage) between the output terminals of the U-phase and the V-phase of the inverter INV. More specifically, the harmonic voltage calculating section 70 extracts harmonic components of certain orders by performing a fast Fourier transform (FFT) analysis of the detection value, and calculates the root-mean-square value of the components as the harmonic voltage Vh. Here, according to the first embodiment, the 5th order, the 7th order, the 11th order, and the 13th order are used as certain orders. This is because hysteresis loss attributed to harmonics of these orders tends to become significant. According to the first embodiment, the harmonic voltage calculating section 70 configures a "harmonic voltage substituting means" of the claims.

The compensation amount calculating section 36 uses the designated torque value Trq*, the electric angular velocity ω, and the harmonic voltage Vh as inputs, and calculates the compensation amount ΔTrq to compensate for hysteresis loss. Here, a three-dimensional map prescribing the relationship between the harmonic voltage Vh, the designated torque value Trq*, and the electric angular velocity ω, and the compensation amount ΔTrq* is used.

The three-dimensional map includes the relationship in an instance in which the harmonic voltage Vh is zero. When the harmonic voltage Vh is zero, the three-dimensional map prescribes the compensation amount ΔTrq for compensating core loss attributed to the fundamental current such as hysteresis loss attributed to the fundamental current, and mechanical loss. On the other hand, when the harmonic voltage Vh is not zero, the three-dimensional map sets the compensation amount ΔTrq for compensating loss attributed to harmonic currents such as hysteresis loss attributed to harmonic currents, in addition to the above. Here, the compensation amount itself for compensating hysteresis loss attributed to harmonic currents is determined by the harmonic voltage and the electric angular velocity ω. Here, the electric angular velocity ω is a parameter used so that hysteresis loss is dependent on frequency. Hysteresis loss attributed to harmonic currents increases as the harmonic currents increase. The harmonic currents increase as the harmonic voltage increases. Therefore, the compensation amount for hysteresis loss attributed to the harmonic voltage Vh increases as the harmonic voltage Vh increases.

Effects according to the first embodiment are as follows.

(1) Hysteresis loss attributed to harmonic currents can be favorably compensated by using the harmonic voltage Vh.

(2) The harmonic voltage Vh can be calculated with high accuracy by using the detection value of the output line-to-line voltage of the inverter INV as input and calculating the harmonic voltage Vh.

(3) The output voltage (designated norm value Vn) of the inverter INV is the feedback manipulated variable (amount to be corrected by the correction amount calculating section 48). In this instance, an unambiguous relationship is not established between the output voltage of the inverter INV and an operating point determined by torque and electric angular velocity. In particular, during transient operation when the designated value (designated torque value Trq*) of the controlled variable of the motor generator 10 and the input voltage (power supply voltage VDC) of the inverter INV change, the output voltage of the inverter INV differs from that during steady operation. Therefore, hysteresis loss attributed to harmonic currents can be compensated with higher accuracy by referencing the output voltage of the inverter INV during calculation of the compensation amount ΔTrq, compared to when the compensation amount is calculated for each operating point without referencing the output voltage of the inverter INV.

(4) The compensation amount ΔTrq for the designated torque value Trq* is calculated in a system in which the requested output of the driving wheel 14 is assigned to the motor generator 10 and the gasoline engine 16. In a system such as this, because high accuracy is required for the torque requested of the motor generator 10, the benefit of using the process for calculating the compensation amount ΔTrq is particularly great.

Second Embodiment

Figure 3:
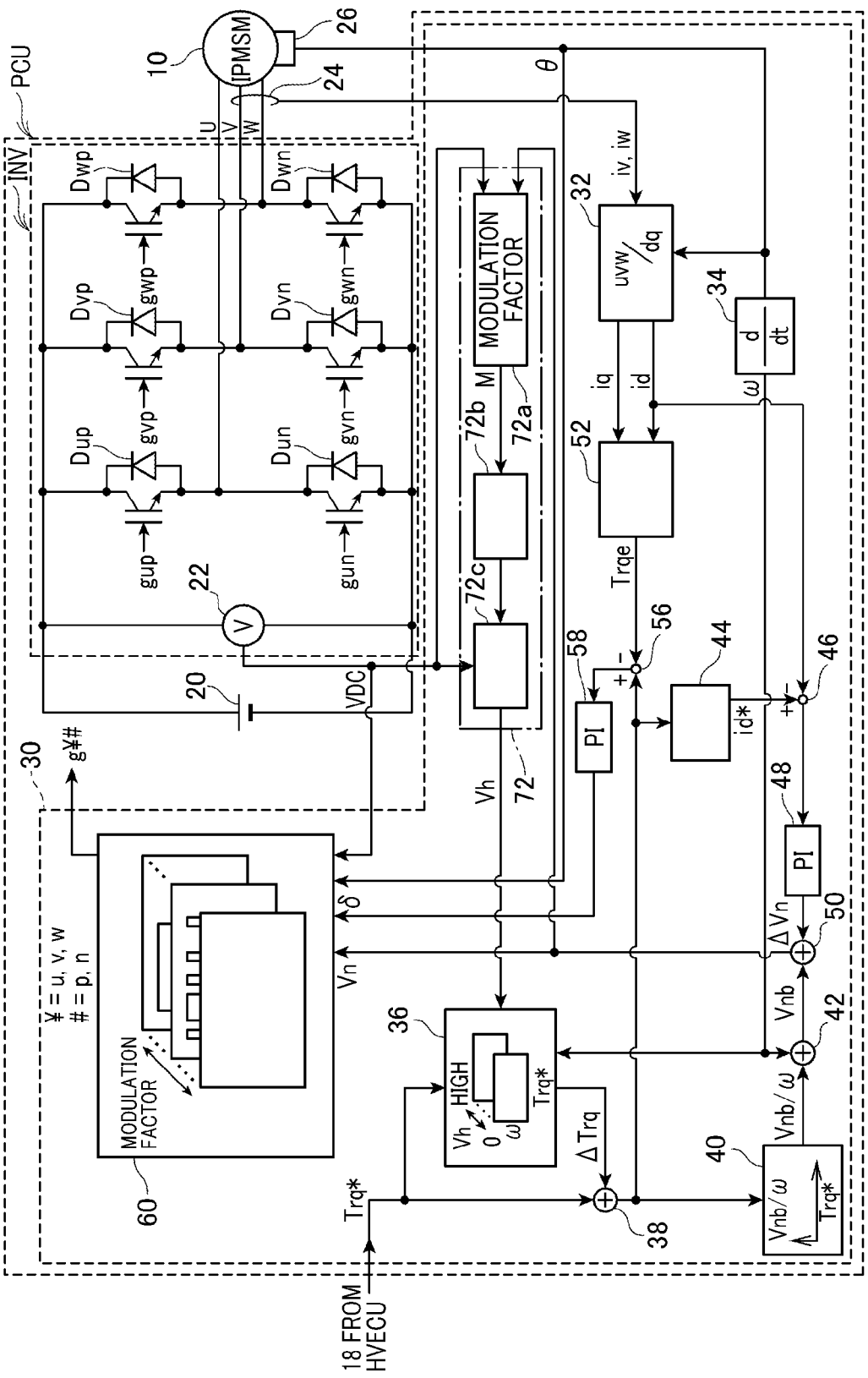
FIG. 3 is a block diagram of processes related to torque control according to a second embodiment.

A second embodiment will hereinafter be described with reference to the drawings, mainly focusing on the differences with the above-described first embodiment. FIG. 3 shows a system configuration according to the second embodiment. Components and processes in FIG. 3 corresponding with those shown in FIG. 2 are given the same reference numbers for convenience. Descriptions thereof are omitted or simplified. This similarly applies to third and subsequent embodiments described hereafter.

As shown in FIG. 3, according to the second embodiment, a harmonic voltage calculating section 72 uses the designated norm value Vn and the power supply voltage VDC as inputs, and calculates the harmonic voltage Vh. In other words, the harmonic voltage calculating section 72 uses the designated norm value Vn and the power supply voltage VDC as inputs and calculates a modulation factor M in a modulation factor calculating section 72a. Here, the modulation factor M is a parameter for determining the harmonic component of output line-to-line voltage of the inverter INV. In other words, when the modulation factor M is low (such as "1.15" or lower), the output line-to-line voltage of the inverter INV can be that simulating the fundamental. In other words, when average values of the voltage of the output terminals of the inverter INV are successively plotted during a single ON/OFF cycle of the switching elements SȲp and SȲn, the output line-to-line voltage determined by the plotted points can be considered as the fundamental (sine wave of the electric angle cycle). Therefore, when the modulation factor M is low, the harmonic voltage can be ignored. On the other hand, when the modulation factor M is high, the harmonic voltage becomes significant because the output line-to-line voltage of the inverter INV cannot be that simulating the fundamental.

The modulation factor M is outputted to a harmonic component calculating section 72b. Here, a harmonic component normalized by the power supply voltage VDC is calculated. This is performed in light of the absolute value of the harmonic voltage not being determined solely by the modulation factor M because the size of the actual harmonic voltage depends on the power supply voltage VDC. Then, a power supply referencing section 72c calculates the harmonic voltage Vh based on the normalized harmonic component calculated by the harmonic component calculating section 72b and the power supply voltage VDC.

According to the second embodiment, in addition to the above-described effects (1), (3), and (4) according to the first embodiment, the following effects can be achieved.

(5) The harmonic component of the actual output voltage of the inverter INV can be calculated with high accuracy by calculating the harmonic voltage Vh using the designated value (designated norm value Vn) related to the fundamental amplitude of the output line-to-line voltage of the inverter INV and the power supply voltage VDC.

Third Embodiment

A third embodiment will hereinafter be described with reference to the drawings, mainly focusing on the differences with the above-described first embodiment.

Figure 4:
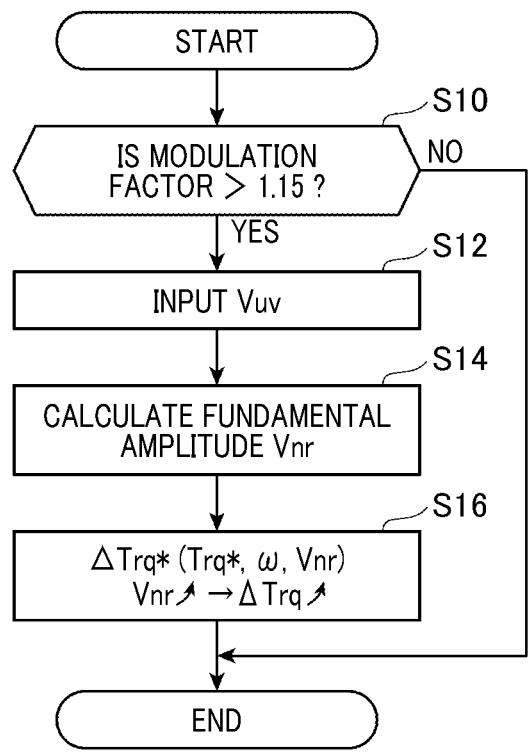
FIG. 4 is a flowchart of procedures in a process for calculating a compensation amount according to a third embodiment.

FIG. 4 shows the processing operations during an overmodulation process in particular, within the process for calculating the compensation amount ΔTrq according to the third embodiment. The process is repeatedly performed by the MGECU 30 at, for example, a predetermined cycle.

In the series of processing operations, first, at Step 10, the MGECU 30 judges whether or not the modulation factor M is greater than 1.15. The MGECU 30 performs the processing operation to judge whether or not an overmodulation process is being performed. Here, the motor generator 10 is determined to be in the overmodulation range when the modulation factor M is greater than 1.15 in light of the setting of the operating signal by the operating signal generating section 60 according to the third embodiment. In other words, according to the third embodiment, it is assumed that the operating signal is set such that the output line-to-line voltage of the inverter INV is that which simulates the fundamental until the fundamental amplitude of the output line-to-line voltage of the inverter INV becomes the power supply voltage VDC.

When judged that the overmodulation process is being performed, at Step 12, the MGECU 30 inputs a detection value Vuv of the line-to-line voltage detected by the line-to-line voltage sensor 28 shown in FIG. 2. At subsequent Step 14, the MGECU 30 calculates a fundamental amplitude Vnr of the detection value Vuv. This processing operation can be performed by FFT analysis or the like. In addition, for example, the detection value Vuv may be treated as the average value of the norms of the vectors that the coordinate is converted to a coordinate system which rotates at the electric angular velocity ω.

Then, at Step 16, the MGECU 30 uses the fundamental amplitude Vnr, the designated torque value Trq*, and the electric angular velocity ω as inputs, and calculates the compensation amount ΔTrq. Here, when the designated torque value Trq* and the electric angular velocity ω are the same, the compensation amount ΔTrq becomes a greater value, the greater the fundamental amplitude Vnr is. This is in light of the harmonic voltage becoming greater, the greater the fundamental amplitude Vnr is, even when the modulation factor is the same. In particular, when field-weakening control is performed, because the modulation factor is constant, the compensation amount ΔTrq can be calculated with high accuracy by increasing the compensation amount ΔTrq depending on the fundamental amplitude Vnr.

As shown in FIG. 2, an open-loop manipulated variable (norm base value Vnb) of the fundamental amplitude of the output line-to-line voltage of the inverter INV is corrected by the correction amount ΔVn of the correction amount calculating section 48. Therefore, the norm base value Vnb determined by the designated torque value Trq* and the electric angular velocity ω does not necessarily match the fundamental amplitude Vnr. Therefore, when the fundamental amplitude Vnr is used, the compensation amount ΔTrq can be set to a more suitable value for compensating for loss, compared to when the fundamental amplitude Vnr is not used.

Fourth Embodiment

A fourth embodiment will hereinafter be described with reference to the drawings, mainly focusing on the differences with the above-described third embodiment.

Figure 5:
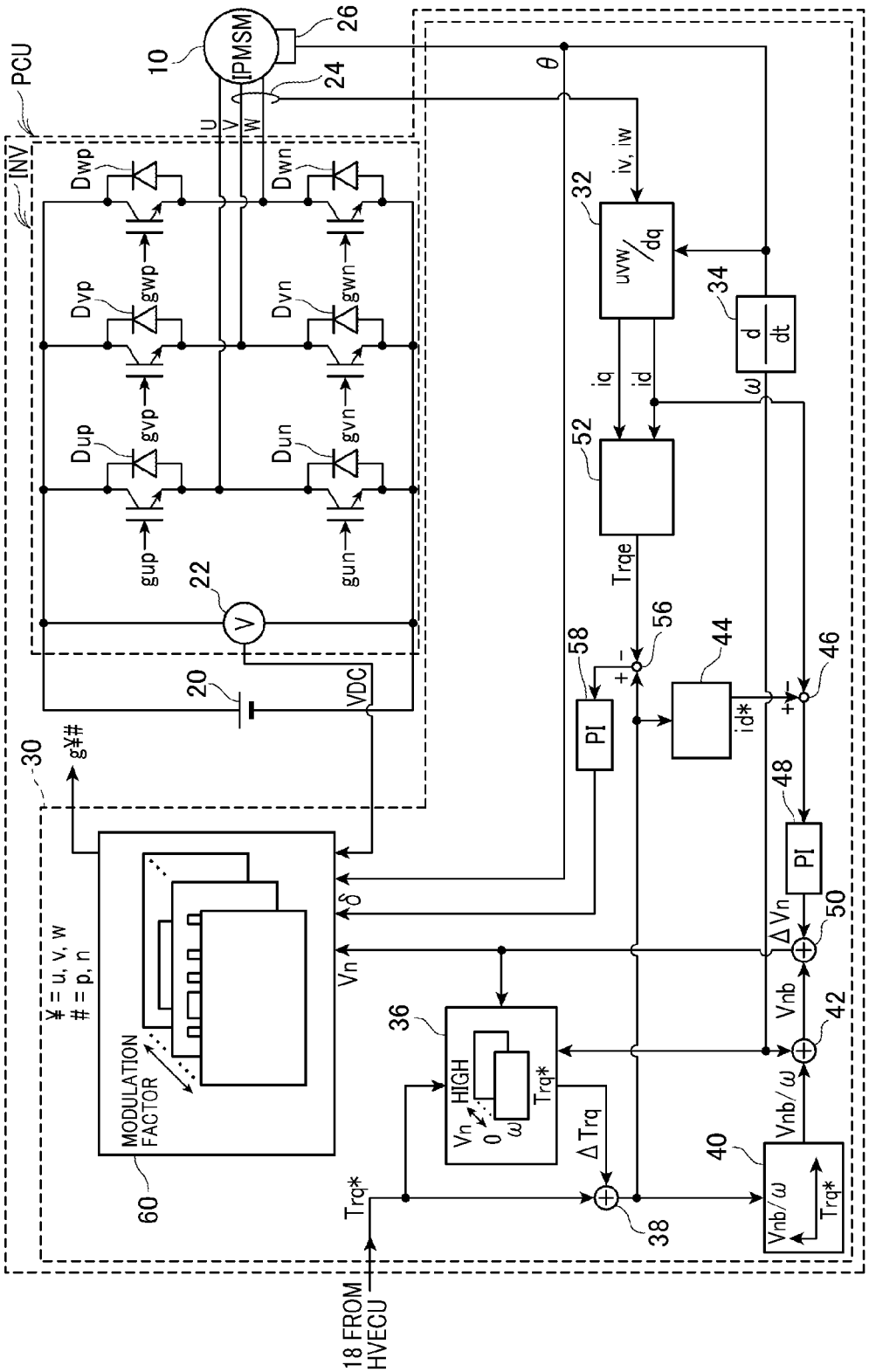
FIG. 5 is a block diagram of processes related to torque control according to a fourth embodiment.

FIG. 5 shows a system configuration according to the fourth embodiment. Components and processes in FIG. 5 corresponding to those shown in FIG. 1 are given the same reference numbers for convenience.

In FIG. 5, processes in the overmodulation range are shown as the processes within the MGECU 30. In the overmodulation range, according to the fourth embodiment, the compensation amount calculating section 36 uses the designated norm value Vn, the designated torque value Trq*, and the electric angular velocity ω as inputs, and calculates the compensation amount ΔTrq.

Figure 6:
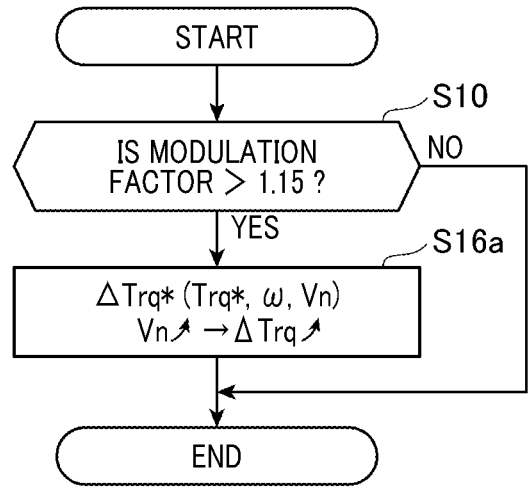
FIG. 6 is a flowchart of procedures in a process for calculating a compensation amount according to the fourth embodiment.

FIG. 6 shows the processing operations during the overmodulation process in particular, within the process for calculating the compensation amount ΔTrq according to the fourth embodiment. The process is repeatedly performed by the MGECU 30 at, for example, a predetermined cycle. Processing operations in FIG. 6 that correspond with those in FIG. 4 are given the same step numbers for convenience.

In the series of processing operations, when judged YES at Step 10, at Step 16a, the MGECU 30 uses the designated norm value Vn in addition to the designated torque value Trq* and the electric angle velocity ω as inputs, and calculates the compensation amount ΔTrq. Here, for the same purpose as at Step 16 in FIG. 4, the compensation value ΔTrq is set to a greater value, the greater the designated norm value Vn is.

Fifth Embodiment

A fifth embodiment will hereinafter be described with reference to the drawings, mainly focusing on the differences with the above-described first embodiment.

Figure 7:
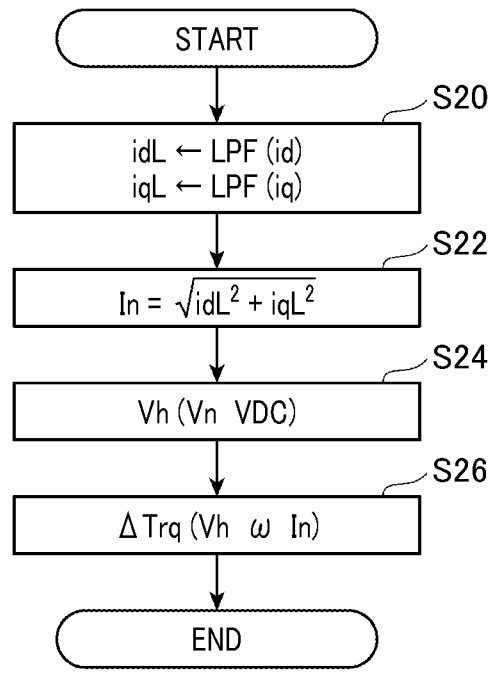
FIG. 7 is a flowchart of procedures in a process for calculating a compensation amount according to a fifth embodiment.

FIG. 7 shows the process for calculating the compensation amount ΔTrq according to the fifth embodiment. The process is repeatedly performed by the MGECU 30 at, for example, a predetermined cycle.

In the series of processing operations, first, at Step 20, the MGECU 30 calculates average currents idL and iqL by performing a low-pass filtering process on the actual currents id and iq. At subsequent Step 22, the MGECU 30 calculates the vector norm (current amplitude In) of the average currents idL and iqL. Furthermore, at Step 24, the MGECU 30 calculates the harmonic voltage Vh in the manner according to the second embodiment, based on the power supply voltage VDC and the designated norm value Vn. Then, at Step 26, the MGECU 30 uses the harmonic voltage Vh, the electric angular velocity ω, and the current amplitude In as inputs, and calculates the compensation amount ΔTrq. Here, when the harmonic voltage Vh is zero, the MGECU 30 calculates the compensation amount for compensating hysteresis loss and the like attributed to the fundamental current based on the electric angular velocity ω and the current amplitude In.

Sixth Embodiment

A sixth embodiment will hereinafter be described with reference to the drawings, mainly focusing on the differences with the above-described first embodiment.

Figure 8:
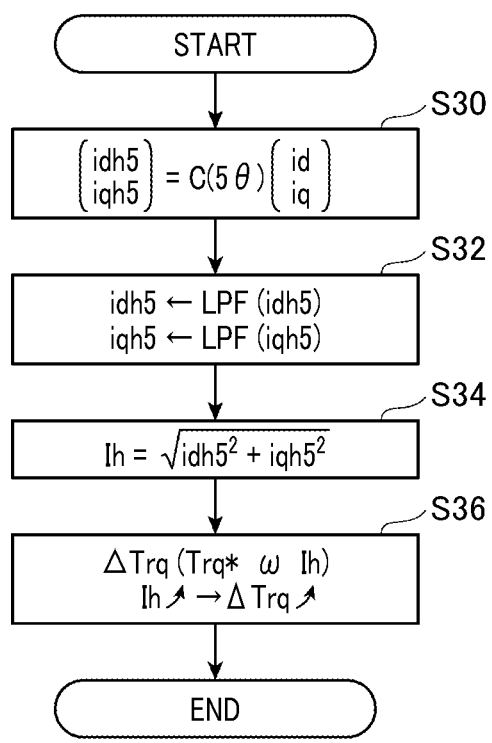
FIG. 8 is a flowchart of procedures in a process for calculating a compensation amount according to a sixth embodiment.

FIG. 8 shows the process for calculating the compensation amount ΔTrq according to the sixth embodiment. The process is repeatedly performed by the MGECU 30 at, for example, a predetermined cycle.

In the series of processing operations, first, at Step 30, the MGECU 30 calculates 5th order harmonic currents idh5 and iqh5 by converting the actual currents id and iq to components of a coordinate system that rotates at a speed of 5ω. Next, at Step 32, the MGECU 30 performs a low-pass filtering process on the 5th order harmonic currents idh5 and iqh5. This is in light of the components determined by the processing operation at Step 30 including components other than the 5th order components to be processed. The other components are thereby removed. Then, at Step 34, the MGECU 30 calculates the vector norm (harmonic amplitude Ih) of the 5th order harmonic currents idh5 and iqh5 to which the low-pass filtering process has been performed. According to the sixth embodiment, the processing operations at Step 30 to Step 34 configure a detection value inputting means.

Figure 9:
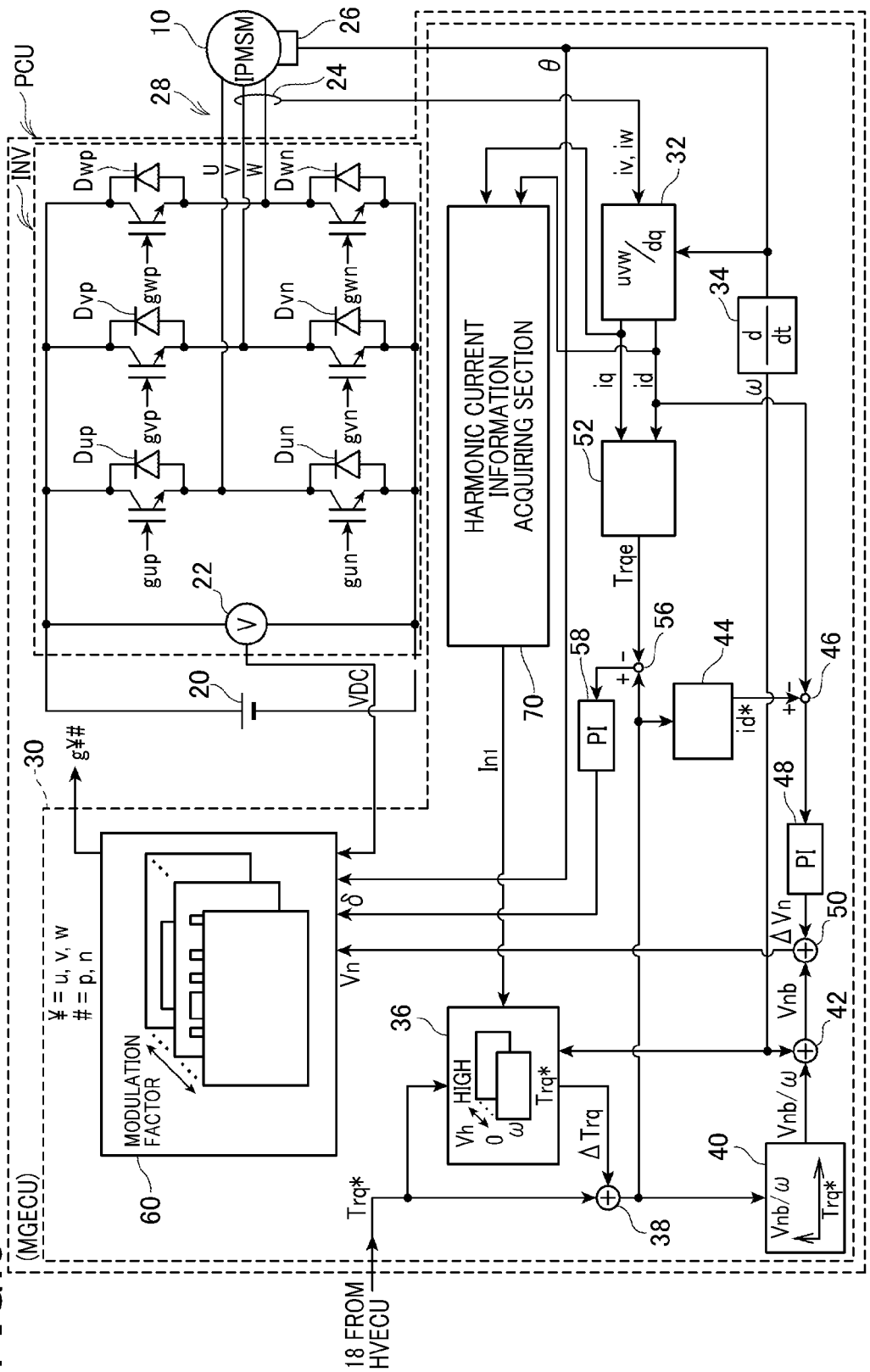
FIG. 9 is a block diagram of processes related to torque control according to the sixth embodiment.

At subsequent Step 36, the MGECU 30 uses the designated torque value Trq*, the electric angular velocity ω, and the harmonic amplitude Ih as inputs, and calculates the compensation amount ΔTrq. Here, when the designated torque value Trq* and the electric angular velocity ω are the same, the compensation amount ΔTrq becomes a greater value, the greater the harmonic amplitude Ih is. A block diagram of processes related to torque control according to the sixth embodiment is shown in FIG. 9. In a harmonic current information acquiring section 70 shown in FIG. 9, a process described in relation to FIG. 8 is performed.

Other Embodiments

The first to sixth embodiments may be modified as follows.
[Regarding the Harmonic Voltage Substituting Means]

According to the first embodiment (FIG. 2), the harmonic voltage Vh is quantified as the sum of the harmonic voltage vector norms of the 5th, 7th, 11th, and 13th orders. However, this is not limited thereto. In the overmodulation range, harmonic voltages of odd-numbered orders excluding the multiples of 3 are generated. In light of this, the harmonic voltage Vn may be the root-mean-square value of the harmonic voltage vector norm of the component of an arbitrary order among the harmonic voltages of odd-numbered orders excluding the multiples of 3.

According to the first embodiment (FIG. 2), the method for calculating the harmonic voltage of the output line-to-line voltage of the inverter INV detected by the voltage sensor 28 is not limited to that using FFT analysis. For example, the method may be that in which a band-pass filtering process is performed on the output line-to-line voltage.

According to the second embodiment (FIG. 3), the harmonic voltage Vh is calculated based on the modulation factor M and the power supply voltage VDC. However, this is not limited thereto. For example, the modulation factor M and the power supply voltage VDC may be outputted to the compensation amount calculating section 36. In this instance, the compensation amount calculating section 36 can calculate the compensation amount Δ based on the modulation factor M, the power supply voltage VDC, the designated torque value Trq*, and the electric angular velocity ω.
[Regarding the Compensation Amount Calculating Means]

According to the first embodiment (FIG. 2), as information related to harmonic voltage, the power supply voltage VDC and the designated norm value Vn may be used as inputs. The compensation amount ΔTrq may be calculated from the three parameters: power supply voltage VDC, designated norm value Vn, and designated torque value Trq*. In this instance as well, an approximate value regarding the electric angular velocity ω can be estimated by the designated norm value Vn and the designated torque value Trq*. Therefore, it is thought that the compensation amount ΔTrq substantially equivalent to that according to the first embodiment can be calculated in a steady operation state. In addition, the compensation amount ΔTrq may be calculated from the three parameters, modulation factor M, power supply voltage VDC, and designated torque value Trq*. Furthermore, a variation example according to the first embodiment is also described under "Regarding the harmonic voltage substituting means".

According to the third embodiment (FIG. 4) and the fourth embodiment (FIG. 6), the compensation amount ΔTrq may be calculated only during field-weakening control.

According to the first embodiment (FIG. 2) and the fifth embodiment (FIG. 7), as the information related to harmonic voltage, the power supply voltage VDC and the designated norm value Vn may be used as inputs. The compensation amount ΔTrq may be calculated from the three parameters: designated norm value Vn, power supply voltage VDC, and electric angular velocity ω. In this instance as well, an approximate value regarding torque can be estimated by the designated norm value Vn and the electric angular velocity ω. Therefore, it is thought that the compensation amount ΔTrq substantially equivalent to those according to the first and sixth embodiments can be calculated in a steady operation state. In addition, the compensation amount ΔTrq may be calculated from the three parameters: modulation factor M, power supply voltage VDC, and electric angular velocity ω.
[Regarding the Detection Value Inputting Means]

According to the sixth embodiment (FIG. 8), the harmonic amplitude Ih is quantified as the 5th order harmonic current vector norm. However, this is not limited thereto. For example, the harmonic amplitude Ih may be the 7th order harmonic current vector norm. Moreover, for example, the harmonic amplitude Ih may be the respective vector norms of the 5th, 7th, 11th, and 13th orders.

Furthermore, the vector norm of the harmonic current obtained by performing a band-pass filtering process on the actual currents id and iq may also be calculated.

[Regarding the Harmonic Current Information Acquiring Section]

The harmonic current information acquiring section is not limited to the harmonic voltage substituting means or the detection value inputting means. For example, the harmonic current information acquiring section may be both the harmonic voltage substituting means and the detection value inputting means. In this instance, the compensation amount calculating means can use a weighted average of the output values of each means as inputs and calculate the compensation amount.

[Regarding the Manipulated Variable Calculating Section]

According to the above-described embodiments, the compensation value ΔTrq is added to the designated torque value Trq*. However, this is not limited thereto. For example, in FIG. 2, the estimated torque Trqe serving as an input parameter of the phase setting section 58 may be corrected by being subtracted by the compensation amount ΔTrq.

[Regarding the Designated Output Voltage Value]

According to each of the above-described embodiments, the feedback correction amount of the norm base value Vnb is the sum of the respective outputs of the proportional element and the integrated element of which the difference between the actual current id and the designated current id* is the input. However, this is not limited thereto. For example, the feedback correction amount may be a sum of the respective outputs of the proportional element, the integrated element, and the derivative element.

The means for calculating the feedback compensation amount of the norm base value Vnb is not limited to that performing feedback control of the actual current id to the designated current id*. For example, the means may be that which performed feedback control of the phases of the designated currents id* and iq* for achieving the designated torque value Trq* to the phases of the actual currents id and iq.

The means for calculating the designated output voltage value by feedback control is not limited to that which performs feedback correction of the norm base value Vnb. For example, the means may be that which uses known current feedback control. This sets the designated voltage on the d-q axis as a manipulated variable for performing feedback control of the actual currents id and iq to the designated currents id* and iq*. In this instance, the final designated voltage on the d-q axis is preferably added to feed-forward terms of known non-interactive control, induced voltage compensation, and the like.

Furthermore, the designated output voltage value may be that composed only of the open-loop manipulated variable of the controlled variable.

[Regarding the Rotating Electrical Machine]

The synchronous motor is not limited to the IPMSM, and may be a surface permanent magnet synchronous motor (SPMSM) or a wound-field synchronous motor. In addition, the rotating electrical machine is not limited to the synchronous motor and may be an induction motor.

The subject to be controlled is not limited to the main driving engine of a hybrid car.

[Regarding Other Means for Generating Torque (Supplemental Driving Engine)]

The other means is not limited to the gasoline engine 16 shown in FIG. 1. For example, the other means may be a power generator. Moreover, the other means itself is not required.

[Regarding the Overmodulation Range]

For example, when the operating signal gY# is generated by performing triangular-wave comparison pulse-width modulation (PWM) on the designated voltages of the three phases as the manipulated variables for achieving the designated torque value Trq*, in a range in which the modulation factor is greater than 1 (one), the output line-to-line voltage of the inverter INV cannot become that simulating the fundamental. Therefore, this range becomes the overmodulation range. Thus, in the range where the modulation factor is greater than 1 (one), the compensation amount ΔTrq is calculated such as to compensate hysteresis loss attributed to harmonic currents.

(Relationship Between Terms)

A "manipulated variable calculating section" may include the compensation amount calculating section 36, the correcting section 38, the norm setting section 40, the velocity multiplying section 42, the designated current setting section 44, the deviation calculating section 46, the compensation amount calculating section 48, the correcting section 50, the torque estimator 52, the deviation calculating section 56, and the phase setting section 58. In addition, an "operating section" corresponds to the operating signal generating section 60. An "alternating-current voltage applying device" corresponds to the inverter INV.

What is claimed is:

1. A control device for a rotating electrical machine, comprising:
    a harmonic current information acquiring section that acquires information related to harmonic currents flowing to the rotating electrical machine;
    a compensation amount calculating section that calculates a compensation amount for compensating an amount of loss attributed to the harmonic currents and an amount of loss attributed to a fundamental current flowing through the rotating electrical machine by using, as input, the acquired information related to harmonic currents, an electric angular velocity of the rotating electrical machine, and a designated torque value of a controlled variable of the rotating electrical machine or a current amplitude of the rotating electrical machine;
    a correcting section that corrects the designated torque value of the controlled variable by adding the compensation amount to the designated torque value of the controlled variable;
    a manipulated variable calculating section that calculates a manipulated variable to control torque serving as a controlled variable of the rotating electrical machine to the designated torque value of the controlled variable corrected by the correcting section; and
    an operating section that operates an alternating-current voltage applying device that applies an alternating-current voltage to the rotating electrical machine, based on the manipulated variable calculated by the manipulated variable calculating section.

2. The control device for a rotating electrical machine according to claim 1, wherein the compensation amount calculating section calculates the compensation amount in such a manner that the compensation amount is a greater value, the greater the harmonic current is.

3. The control device for a rotating electrical machine according to claim 1, wherein the harmonic current information acquiring section includes a harmonic voltage substituting section that uses an output voltage of the alternating-current voltage applying device as input, and acquires harmonic component information of the output voltage as the information related to harmonic currents.

4. The control device for a rotating electrical machine according to claim 3, wherein the compensation amount calculating section calculates the compensation amount by using, as inputs, the information related to harmonic voltage acquired by the harmonic voltage substituting section and at least one of torque of the rotating electrical machine or a current flowing through the rotating electrical machine.

5. The control device for a rotating electrical machine according to claim 3, wherein the compensation amount calculating section calculates the compensation amount by using, as inputs, the information related to harmonic voltage acquired by the harmonic voltage substituting section and an electric angular velocity of the rotating electrical machine.

6. The control device for a rotating electrical machine according to claim 1, wherein the compensation amount calculating section calculates the compensation amount for compensating an amount of loss attributed to the harmonic currents by using, as inputs, the information related to harmonic voltage acquired by the harmonic voltage substituting section, at least one of torque of the rotating electrical machine or a current flowing through the rotating electrical machine, and an electric angular velocity of the rotating electrical machine.

7. The control device for a rotating electrical machine according to claim 6, wherein
   the alternating-current voltage applying device is a direct current-to-alternating current converter circuit that selectively connects a terminal of the rotating electrical machine with a positive electrode or a negative electrode of a direct-current voltage source; and
   the manipulated variable calculating section performs a process for calculating a manipulated variable based on the information related to harmonic currents in at least an overmodulation range.

8. The control device for a rotating electrical machine according to claim 7, wherein
   the rotating electrical machine includes a rotating shaft mechanically connected to another means for generating torque subjected to electronic control; and
   the designated torque value serving as input of the manipulated variable calculating section is a torque value assigned to the rotating electrical machine among torque value respectively assigned to the other means and the rotating electrical machine.

9. The control device for a rotating electrical machine according to claim 1, wherein
   the alternating-current voltage applying device is a direct current-to-alternating current converter circuit including switching elements that respectively open and close between a terminal of the rotating electrical machine and a positive electrode and a negative electrode of a direct-current voltage source;
   the operating section manipulates an output voltage of the direct current-to-alternating current converter circuit as the manipulated variable for controlling the controlled variable of the rotating electrical machine; and
   the compensation amount calculating section calculates the compensation amount to be a greater value, the greater a fundamental amplitude of an output line-to-line voltage of the direct current-to-alternating current converter circuit is, in an overmodulation range.

10. The control device for a rotating electrical machine according to claim 1, wherein
    the alternating-current voltage applying device is a direct current-to-alternating current converter circuit including switching elements that respectively open and close between a terminal of the rotating electrical machine and a positive electrode and a negative electrode of a direct-current voltage source; and
    the output voltage of the alternating-current voltage applying device serving as input of the harmonic voltage substituting section is a designated output voltage value of the direct current-to-alternating current converter circuit.

11. The control device for a rotating electrical machine according to claim 10, wherein
    the alternating-current voltage applying device is a direct current-to-alternating current converter circuit including switching elements that respectively open and close between a terminal of the rotating electrical machine and a positive electrode and a negative electrode of a direct-current voltage source; and
    the harmonic voltage substituting section uses a terminal voltage of the direct-current voltage source, in addition to the output voltage, as input and calculates the information related to harmonic voltage.

12. The control device for a rotating electrical machine according to claim 10, wherein the compensation amount calculating section calculates compensation amount by using, as inputs, the information related to harmonic voltage acquired by the harmonic voltage substituting section, at least one of torque of the rotating electrical machine or a current flowing through the rotating electrical machine, and an electric angular velocity of the rotating electrical machine.

13. The control device for a rotating electrical machine according to claim 12, wherein
    the alternating-current voltage applying device is a direct current-to-alternating current converter circuit including switching elements that respectively open and close between a terminal of the rotating electrical machine and a positive electrode and a negative electrode of a direct-current voltage source;
    the operating section manipulates an output voltage of the direct current-to-alternating current converter circuit as the manipulated variable for controlling the controlled variable of the rotating electrical machine; and
    the compensation amount calculating section calculates the compensation amount to be a greater value, the greater a fundamental amplitude of an output line-to-line voltage of the direct current-to-alternating current converter circuit is, in an overmodulation range.

14. The control device for a rotating electrical machine according to claim 13, wherein
    the rotating electrical machine includes a rotating shaft mechanically connected to another means for generating torque subjected to electronic control; and
    the designated torque value serving as input of the manipulated variable calculating section is a torque value assigned to the rotating electrical machine among torque value respectively assigned to the other means and the rotating electrical machine.

15. The control device for a rotating electrical machine according to claim 1, wherein the harmonic current information acquiring section includes a detection value inputting section that uses a detection value of a current flowing through the rotating electrical machine as input and acquires the information related to harmonic currents.

16. The control device for a rotating electrical machine according to claim 15, wherein
    the alternating-current voltage applying device is a direct current-to-alternating current converter circuit that selectively connects a terminal of the rotating electrical machine with a positive electrode or a negative electrode of a direct-current voltage source; and
    the manipulated variable calculating section performs a process for calculating a manipulated variable based on the information related to harmonic currents in at least an overmodulation range.

17. The control device for a rotating electrical machine according to claim 16, wherein
the rotating electrical machine includes a rotating shaft mechanically connected to another means for generating torque subjected to electronic control; and
the designated torque value serving as input of the manipulated variable calculating section is a torque value assigned to the rotating electrical machine among torque value respectively assigned to the other means and the rotating electrical machine.

18. A power control unit for a rotating electrical machine, comprising:
an inverter; and
a motor generator electronic control unit for operating the inverter, the motor generator electronic control unit being configured to:
  acquire information related to harmonic currents flowing to the rotating electrical machine;
  calculate a compensation amount for compensating an amount of loss attributed to the harmonic currents and an amount of loss attributed to a fundamental current flowing through the rotating electrical machine by using, as input, the acquired information related to harmonic currents, an electric angular velocity of the rotating electrical machine, and a designated torque value of a controlled variable of the rotating electrical machine or a current amplitude of the rotating electrical machine;
  correct the designated torque value of the controlled variable by adding the compensation amount to the designated torque value of the controlled variable;
  calculate a manipulated variable to control torque serving as a controlled variable of the rotating electrical machine to the corrected designated torque value of the controlled variable; and
  operate an alternating-current voltage applying device that applies an alternating-current voltage to the rotating electrical machine, based on the calculated manipulated variable.

* * * * *